United States Patent
Anderson et al.

(10) Patent No.: US 10,417,139 B2
(45) Date of Patent: Sep. 17, 2019

(54) CACHE MANAGEMENT BASED ON TYPES OF I/O OPERATIONS

(71) Applicant: INTERNATIONAL BUSINESS MACHINES CORPORATION, Armonk, NY (US)

(72) Inventors: Kyler A. Anderson, Sahuarita, AZ (US); Kevin J. Ash, Tucson, AZ (US); Lokesh M. Gupta, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 85 days.

(21) Appl. No.: 15/680,577

(22) Filed: Aug. 18, 2017

(65) Prior Publication Data
US 2019/0057037 A1    Feb. 21, 2019

(51) Int. Cl.
*G06F 12/08* (2016.01)
*G06F 12/0895* (2016.01)

(52) U.S. Cl.
CPC .. *G06F 12/0895* (2013.01); *G06F 2212/1024* (2013.01); *G06F 2212/1041* (2013.01); *G06F 2212/282* (2013.01)

(58) Field of Classification Search
CPC ............. G06F 12/0871; G06F 12/0895; G06F 12/126; G06F 12/127; G06F 2212/1024; G06F 2212/1041; G06F 2212/282

USPC .................................................. 711/129, 134
See application file for complete search history.

(56) References Cited

U.S. PATENT DOCUMENTS

| 5,381,539 A * | 1/1995 | Yanai ................. G06F 12/0862 711/129 |
| 8,966,178 B2 | 2/2015 | Ash et al. |
| 9,063,945 B2 | 6/2015 | Benhase et al. |
| 2014/0304479 A1 | 10/2014 | Benhase et al. |
| 2017/0068624 A1 | 3/2017 | Ash et al. |
| 2017/0091106 A1 | 3/2017 | Ash et al. |
| 2017/0097903 A1 | 4/2017 | Craddock et al. |
| 2017/0371813 A1* | 12/2017 | Brewer ............... G06F 13/1689 |

OTHER PUBLICATIONS

PCT International Search Report and Written Opinion dated Dec. 5, 2018, for Serial No. PCT/IB2018/056028 filed Aug. 10, 2018, pp. 8.

* cited by examiner

*Primary Examiner* — Gary J Portka
(74) *Attorney, Agent, or Firm* — Rabindranath Dutta; Konrad Raynes Davda & Victor LLP

(57) ABSTRACT

A list of a first type of tracks in a cache is generated. A list of a second type of tracks in the cache is generated, wherein I/O operations are completed relatively faster to the first type of tracks than to the second type of tracks. A determination is made as to whether to demote a track from the list of the first type of tracks or from the list of the second type of tracks.

25 Claims, 10 Drawing Sheets

CACHE MANAGEMENT BASED ON TYPES OF I/O OPERATIONS

BACKGROUND

1. Field

Embodiments relate to cache management based on types of input/output (I/O) operations.

2. Background

In certain storage system environments, a storage controller (or a storage controller complex) may comprise a plurality of storage servers that are coupled to each other. The storage controller allows host computing systems to perform input/output (I/O) operations with storage devices controlled by the storage controller, where the host computing systems may be referred to as hosts.

The storage controller includes a cache that stores data so that future requests for that data from the host may be served faster. Data may be written to or read from the cache much faster in comparison to writing to or reading from the storage device. A cache hit occurs when requested data from the host can be found in the cache, while a cache miss occurs when the requested data cannot be found in the cache. Cache hits are served by reading data from the cache, which is faster than reading from a storage device coupled to the storage controller.

When a cache is low on space or segments, then the cache needs to evict data items from the cache and this eviction of data items from the cache is referred to as demotion. A cache replacement policy may be used to determine which data items in the cache are to be demoted to make room for new data items. A least recently used (LRU) policy demotes the least recently used data items first.

SUMMARY OF THE PREFERRED EMBODIMENTS

Provided are a method, system, and computer program product in which a list of a first type of tracks in a cache is generated. A list of a second type of tracks in the cache is generated, wherein I/O operations are completed relatively faster to the first type of tracks than to the second type of tracks. A determination is made as to whether to demote a track from the list of the first type of tracks or from the list of the second type of tracks. As a result of the determination, the tracks that are demoted increase the rate of I/O operations.

In further embodiments, the first type of tracks are syncio tracks, wherein for performing an I/O operation to a syncio track, an application thread is held in a spin loop waiting for the I/O operation to complete. As a result, in certain embodiments it may be desirable not to demote syncio tracks, in order to increase the rate of I/O operations.

In yet further embodiments, the second type of tracks are non-syncio tracks, wherein for performing the I/O operation to a non-syncio track, holding of the application thread in the spin loop is avoided, and wherein a track is added to the list of the first type of tracks or to the list of the second type of tracks based on whether a last I/O operation performed on the track is a first type of I/O operation comprising a syncio operation or a second type of I/O operation comprising a non-syncio operation. As a result, the rate of I/O operations is increased by building two different types of lists.

In further embodiments, tracks in the list of the first type of tracks are ordered based on how recently each track in the list of the first type of tracks has been used, wherein tracks in the list of the second type of tracks are ordered based on how recently each track in the list of the second type of tracks has been used. As a result, the rate of I/O operations is increased by building two different types of least recently used lists of tracks.

In certain embodiments, in response to determining that a read hit ratio for tracks in the list of the second type of tracks is less than a predetermined factor of a read hit ratio for tracks in the first type of tracks, a track is demoted from the list of the second type of tracks. As a result of demotion from the second type of tracks, the rate of I/O operations is increased.

In additional embodiments, the read hit ratio for tracks in the list of the first type of tracks and the read hit ratio for tracks in the list of the second type of tracks are computed based on read hits on a predetermined bottom portion of the list of the first type of tracks and the second type of tracks. As a result, the demotion of tracks is based on collecting statistics on a set of more recently used tracks.

In further embodiments, the predetermined factor is adjusted to increase a rate of input/output (I/O) operations. As a result, whenever it is possible, tracks from a LRU list of non-syncio tracks are demoted rather than tracks from a LRU list of syncio tracks, unless the rate of I/O operations in the system decrease as a result of such demotions.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Syncio (also referred to as sync I/O) comprises an attachment hardware and protocol for computational devices. Syncio is designed for very low latency random reads and small block sequential writes. Syncio connections between computational devices may be over point to point optical Peripheral Component Interconnect Express (PCIe) interfaces. Syncio operations behave differently than traditional I/O in that in syncio a host computational device may hold an application thread in a spin loop while waiting for the I/O operation to complete. This avoids the need for processor cycles to perform the two context swaps of traditional I/O, the need to perform operations for putting the I/O thread to sleep and then re-dispatching the I/O thread, and the need for an I/O interrupt.

The code path in a computational device needs to be extremely optimized to meet the time requirements for syncio operation. Any condition which delays a syncio operation, such as a cache miss may generate a status that indicates that the syncio operation cannot be performed, and the syncio operation may have to be retried. Since a syncio operation may be successfully performed only when there is a cache hit, certain embodiments are provided to increase cache hits for syncio operations. In such embodiments, by maintaining separate least recently used (LRU) lists for syncio tracks and non-syncio tracks and using demotion mechanisms based on the separate LRU lists, syncio operations are completed faster in comparison to embodiments in which only a single LRU list is maintained. In certain embodiments, whenever it is possible, tracks from the LRU list of non-syncio tracks are demoted rather than tracks from the LRU list of syncio tracks, unless the rate of I/O operations in the system decrease as a result of such demotions.

Exemplary Embodiments

Figure 1:
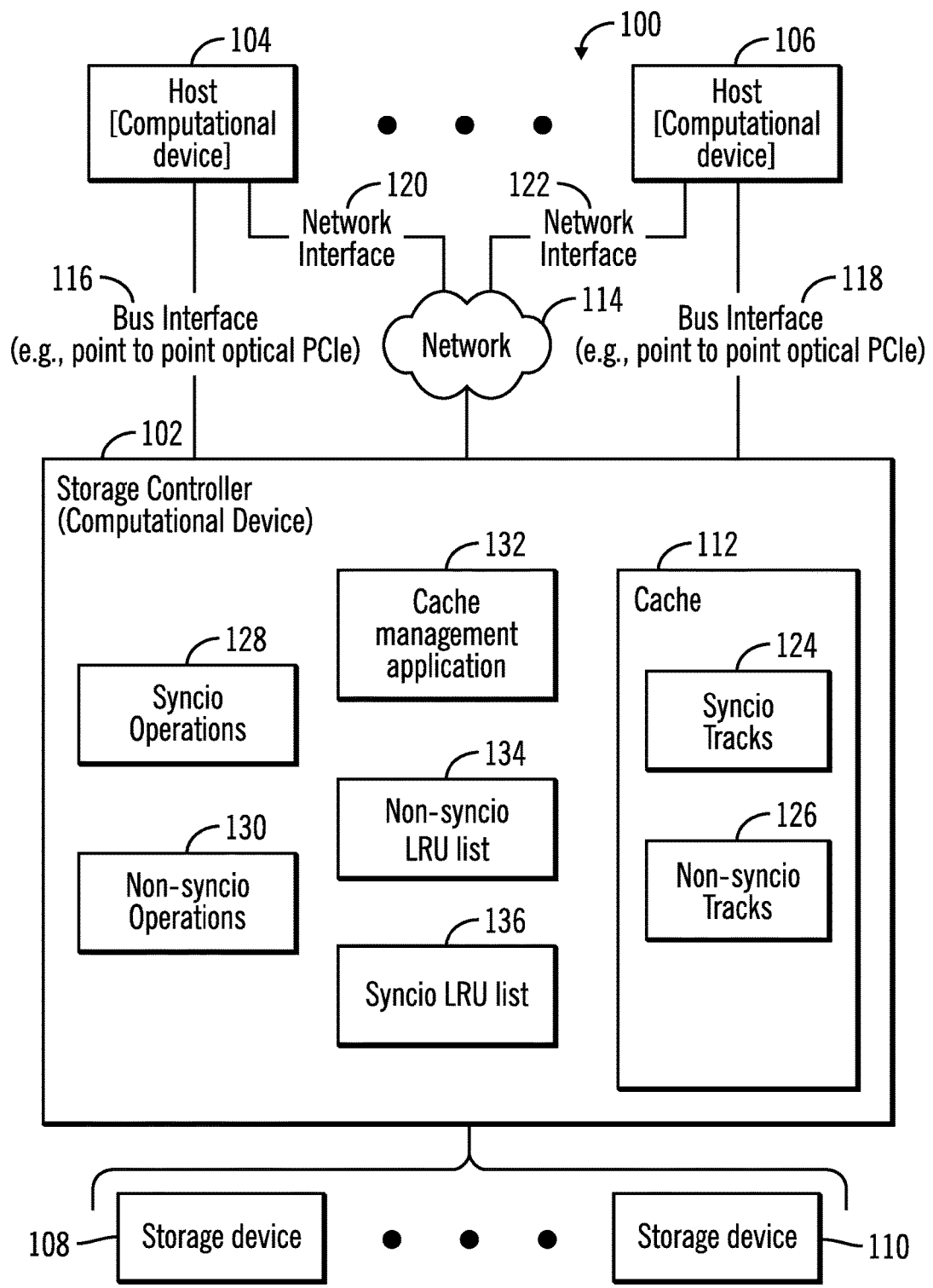
FIG. 1 illustrates a block diagram of a computing environment comprising a storage controller coupled to one or more hosts and one or more storage devices, where syncio based I/O operations occur from the host to the storage controller, in accordance with certain embodiments.

FIG. 1 illustrates a block diagram of a computing environment 100 comprising a storage controller 102 coupled to one or more hosts 104, 106, and one or more storage devices 108, 110, in accordance with certain embodiments. The storage controller 102 allows the plurality of hosts 104, 106 to perform input/output (I/O) operations with logical storage maintained by the storage controller 102. The physical storage corresponding to the logical storage may be found in one or more of the storage devices 108, 110 and/or a cache 112 (e.g., a memory) of the storage controller 102.

The storage controller 102 and the hosts 104, 106 may comprise any suitable computational device including those presently known in the art, such as, a personal computer, a workstation, a server, a mainframe, a hand held computer, a palm top computer, a telephony device, a network appliance, a blade computer, a processing device, etc. The storage controller 102, the hosts 104, 106, and the storage devices 108, 110 may be elements in any suitable network 114, such as, a storage area network, a wide area network, the Internet, an intranet. In certain embodiments, the storage controller 102, the hosts 104, 106, and the storage devices 108, 110 may be elements in a cloud computing environment that comprises the computing environment 100. The storage devices 108, 110 may be comprised of storage disks, tape drives, solid state storage, etc., and may be controlled by the storage controller 102.

In certain embodiments, the hosts 104, 106 may be coupled to the storage controller 102 via a bus interface (e.g., a point to point optical PCIe interface) 116, 118 and a network interface 120, 122. Syncio operations from the hosts 104, 106 may be performed over the bus interfaces 116, 118. Traditional I/O operations (i.e., non-syncio operations) from the hosts 104, 106 may be performed over the network interfaces 120, 122. The bus interfaces 116, 118 may comprise a faster access channel for I/O than the network interfaces 120, 122. Additional bus interface technology to extend the bus interface 116, 118 may be utilized, including PCIe extender cables or components, such as a distributed PCIe switch, to allow PCIe over Ethernet, such as with the ExpEther technology.

The cache 112 may in certain embodiments may comprise a read/write cache partitioned into one or more ranks, where each rank may include one or more storage tracks. The cache 112 may be any suitable cache known in the art or developed in the future. In some embodiments, the cache 112 may be implemented with a volatile memory and/or non-volatile memory. The cache 112 may store both modified and unmodified data. The cache 112 may store data in a plurality of tracks that include syncio tracks 124 and non-syncio tracks 126. Syncio tracks 124 may be read from and written to via syncio operations 128 that are performed on the storage controller 102 from the hosts 104, 106, and non-syncio tracks 126 may be read from and written to via non-syncio I/O operations 130 that are performed on the storage controller 102 from the hosts 104, 106. A cache management application 132 generates a non-syncio least recently used (LRU) list 134 of unmodified syncio tracks in the cache 112 and syncio LRU list 136 of unmodified non-syncio tracks in the cache 112, where the unmodified syncio tracks and the unmodified non-syncio tracks are candidates for demotion from the cache 112 to free up space in the cache 112. In certain embodiments, the cache management application 132 may be implemented in software, hardware, firmware or any combination thereof.

Figure 2:
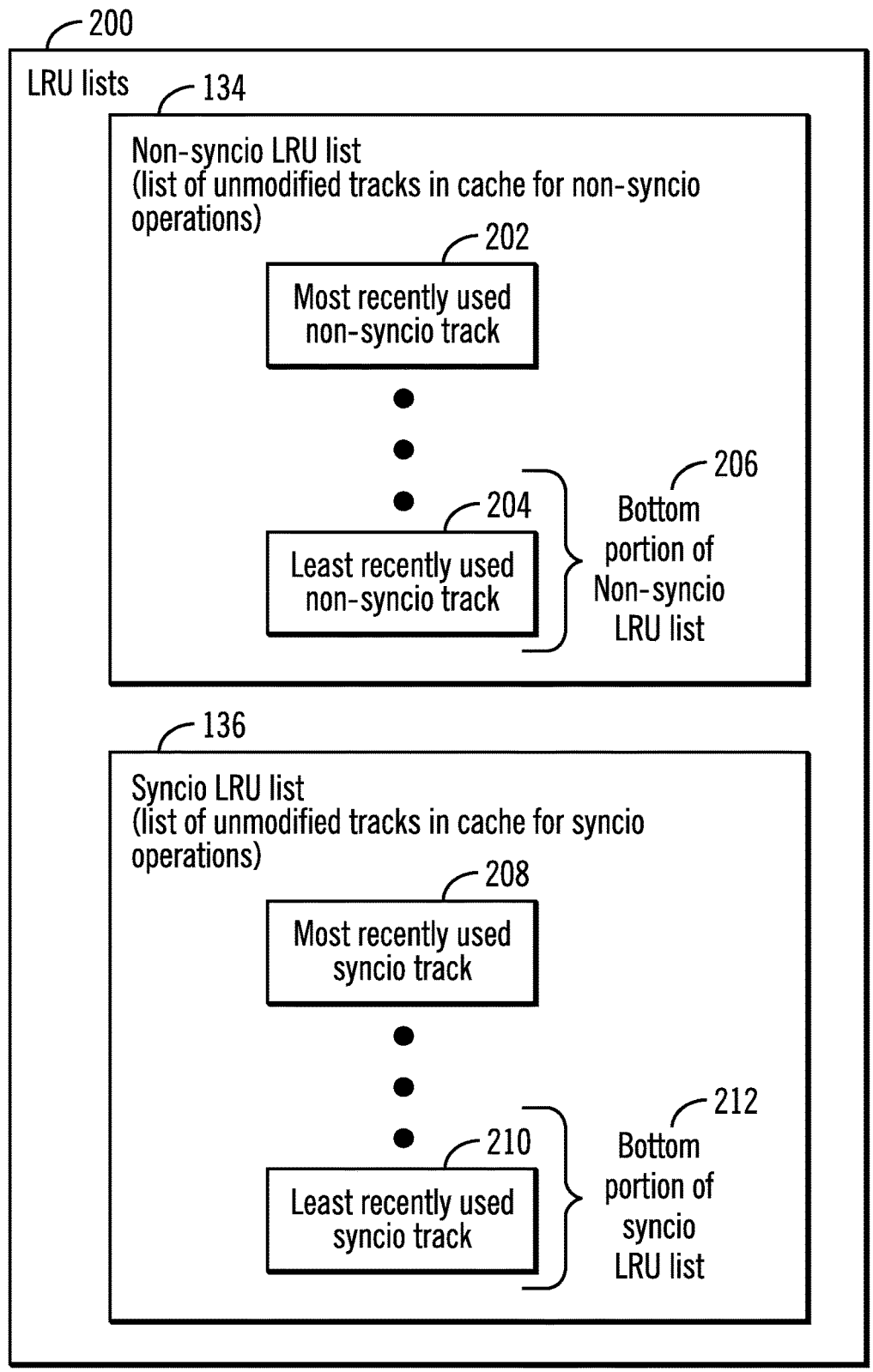
FIG. 2 illustrates a block diagram that shows how least recently used (LRU) lists of tracks are maintained in the storage controller, in accordance with certain embodiments.

FIG. 2 illustrates a block diagram 200 that shows how LRU lists of tracks are maintained in the storage controller 102, in accordance with certain embodiments.

The non-syncio LRU list 134 is a list of unmodified non-syncio tracks in the cache 112 to which non-syncio operations may be performed, and the syncio LRU list 136 is a list of unmodified syncio tracks in the cache 112 to which syncio operations may be performed.

The entries in the non-syncio LRU list 134 are unmodified non-syncio tracks in the cache 112 placed from top to bottom from the most recently used 202 to the least recently used 204. A number of predetermined entries at the bottom portion 206 of the non-syncio LRU list 134 may be used for computing read hit ratio on the non-syncio LRU list 134. By selecting only the bottom portion 206 (e.g., the 1000 least recently used non-syncio tracks in the non-syncio LRU list 134) for computing the read hit ratio on the non-syncio LRU list 134, the read hit ratio is determined for the potential tracks for demotion from the cache 112.

The entries in the syncio LRU list 136 are unmodified syncio tracks in the cache 112 placed from top to bottom from the most recently used 208 to the least recently used 210. A number of predetermined entries at the bottom portion 212 of the syncio LRU list 136 may be used for computing read hit ratio on the syncio LRU list 136. By selecting only the bottom portion 212 (e.g., the 1000 least recently used syncio tracks in the syncio LRU list 136) for computing the read hit ratio on the syncio LRU list 136, the read hit ratio is determined for the potential tracks for demotion from the cache 112.

Figure 3:
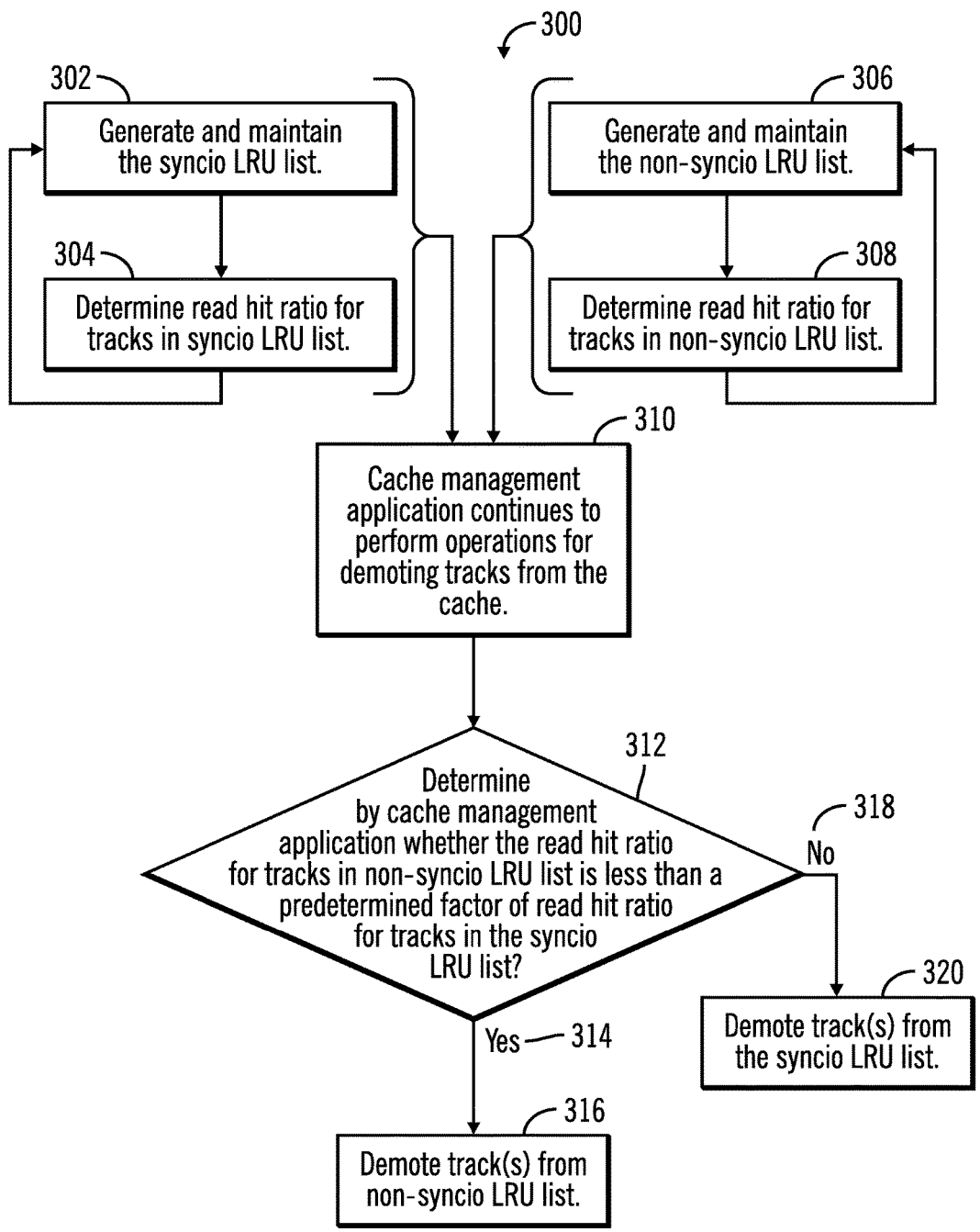
FIG. 3 illustrates a first flowchart that shows demotion of tracks from a non-syncio LRU list or from a syncio LRU list, in accordance with certain embodiments.

FIG. 3 illustrates a first flowchart 300 that shows demotion of tracks from a non-syncio LRU list or from a syncio LRU list, in accordance with certain embodiments. The operations shown in FIG. 3 may be performed by the cache management application 132 that executes in the storage controller 102.

Control starts at block 302 in which the cache management application 132 generates and maintains the syncio LRU list 136. The cache management application 132 determines (at block 304) the read hit ratio for tracks in the syncio LRU list 136 and control returns to block 302.

In parallel to the operations shown in blocks 302, 304, the cache management application 132 generates and maintains the non-syncio LRU list 134 (at block 306). The cache management application 132 determines (at block 308) the read hit ratio for tracks in the non-syncio LRU list 134 and control returns to block 306.

While the operations of blocks 302, 304, 306, 308 are being performed, the cache management application 132 continues or starts performing (at block 310) operations for demoting tracks from the cache 112. The cache management application 132 determines (at block 312) whether the read hit ratio for tracks in the non-syncio LRU list 134 is less than a predetermined factor (e.g., multiple) of read hit ratio for tracks in the syncio LRU list 136. For example, if the read hit ratio for tracks in the non-syncio LRU list 134 is 0.2, the read hit ratio for tracks in the syncio LRU list 136 is 0.1, and the predetermined factor is 3, then the read hit ratio for tracks in the syncio LRU list multiplied by the predetermined factor is 0.3. The read hit ratio for tracks in the non-syncio LRU list 134 is 0.2 which is less than 0.3. Therefore, in this example, the read hit ratio for tracks in the non-syncio LRU list 134 is less than a predetermined factor of read hit ratio for tracks in the syncio LRU list 136.

If at block 312, it is determined that the read hit ratio for tracks in the non-syncio LRU list 134 is less than the predetermined factor of read hit ratio for tracks in the syncio LRU list 136 ("Yes branch 314), then the cache management application 132 demotes (at block 316) tracks from the non-syncio LRU list 134, and the performance of syncio operations may be enhanced over situations in which syncio tracks are demoted. The tracks in the non-syncio LRU list 134 are being used sufficiently less than the tracks in the syncio LRU list 136 and so it is desirable to demote from the non-syncio LRU list 134.

If at block 312 it is determined that the read hit ratio for tracks in the non-syncio LRU list 134 is not less than the predetermined factor of read hit ratio for tracks in the syncio LRU list 136 ("No" branch 318), then the cache management application 132 demotes (at block 320) tracks from the syncio LRU list 136. The tracks in the non-syncio LRU list 134 are being used sufficiently more than the tracks in the syncio LRU list 136 and so it is desirable to demote from the syncio LRU list 136. There may be relatively few read hits on tracks in the syncio LRU list 136 and so it is desirable to demote tracks from the syncio LRU list 136.

Therefore, FIG. 3 describes embodiments in which by maintaining different LRU lists for syncio and non-syncio tracks, the syncio operations may be executed faster in comparison to embodiments in which only a single LRU list is maintained.

Figure 4:
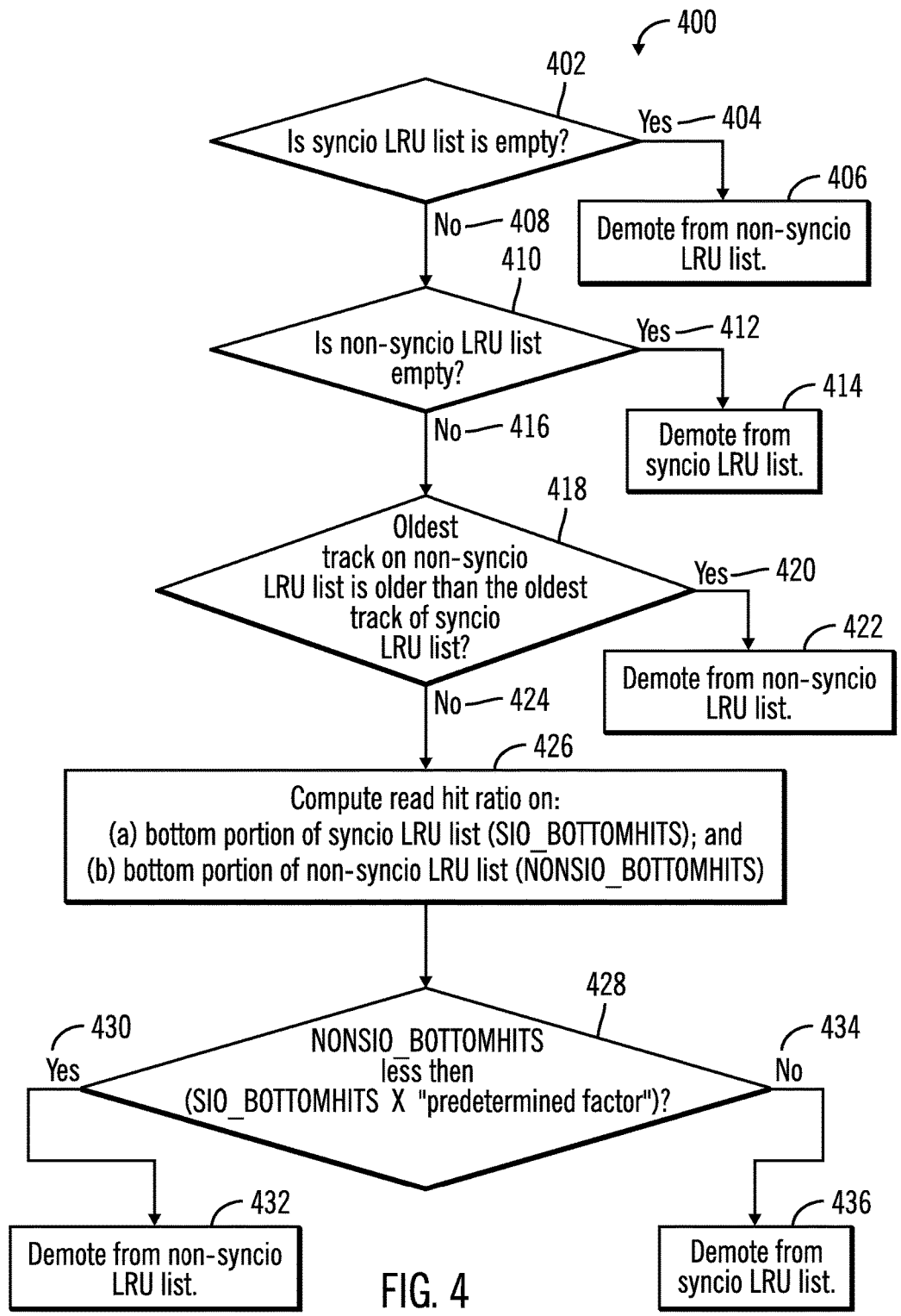
FIG. 4 illustrates a second flowchart that shows demotion of tracks from a non-syncio LRU list or from a syncio LRU list, in accordance with certain embodiments.

FIG. 4 illustrates a second flowchart that shows demotion of tracks from a non-syncio LRU list 134 or from a syncio LRU list 136 in accordance with certain embodiments. The operations shown in FIG. 4 may be performed by the cache management application 132 that executes in the storage controller 102.

Control starts at block 402 in which the cache management application 132 determines whether the syncio LRU list 136 is empty. If so ("Yes" branch 404) control proceeds to block 406 in which the cache management application 132 demotes tracks from the non-syncio LRU list 134. Otherwise ("No" branch 408), control proceeds to block 410 in which the cache management application 132 determines whether the non-syncio LRU list 134 is empty.

If at block 410, the cache management application 132 determines that the non-syncio LRU list 134 is empty ("Yes" branch 412), then the cache management application 132 demotes tracks from the syncio LRU list 136. Otherwise ("No" branch 416) control proceeds to block 418 in which the cache management application 132 determines whether the oldest track of the non-syncio LRU list 134 is older than the oldest track of the syncio LRU list 136, where the oldest track of a list is the track that was last used (i.e., read hit occurred on the track) at a time before the last use of all other tracks in the list, and a first track that was last used at a time before the last use of a second track is older than the second track.

If at block 418, the cache management application 132 determines that the oldest track of the non-syncio LRU list 134 is older than the oldest track of the syncio LRU list 136 ("Yes" branch 420) control proceeds to block 422 in which the cache management application 132 demotes tracks from the non-syncio LRU list 134. Otherwise ("No" branch 424), the cache management application 132 computes (at block 426) the read hit ratio on the following: (a) bottom portion of syncio LRU list 212; and (b) bottom portion of non-syncio LRU list 206.

The read hit ratio on the bottom portion of syncio LRU list 212 is referred to as SIO_BOTTOMHITS and the read hit ratio on the bottom portion of non-syncio LRU list 206 is referred to as NONSIO_BOTTOMHITS.

From block 426 control proceeds to block 428 in which the cache management application 132 determines whether the NONSIO_BOTTOMHITS is less than the SIO_BOTTOMHITS multiplied by a predetermined factor. If so ("Yes" branch 430), the cache management application 132 demotes tracks from the non-syncio LRU list 134. Otherwise ("No" branch 434), the cache management application 132 demotes (at block 436) tracks from the syncio LRU list 136.

Therefore, FIG. 4 illustrates certain embodiments in which at least the bottom portions 206, 212 of the non-syncio LRU list 134 and the syncio LRU list 136 are used for the comparison of read hits so that the comparison is made of read hits on tracks that are relatively older tracks in the non-syncio LRU list 134 and the syncio LRU list 136. The demotions of tracks are from these relatively older tracks so read hit ratio is computed for these relatively older tracks.

Figure 5:
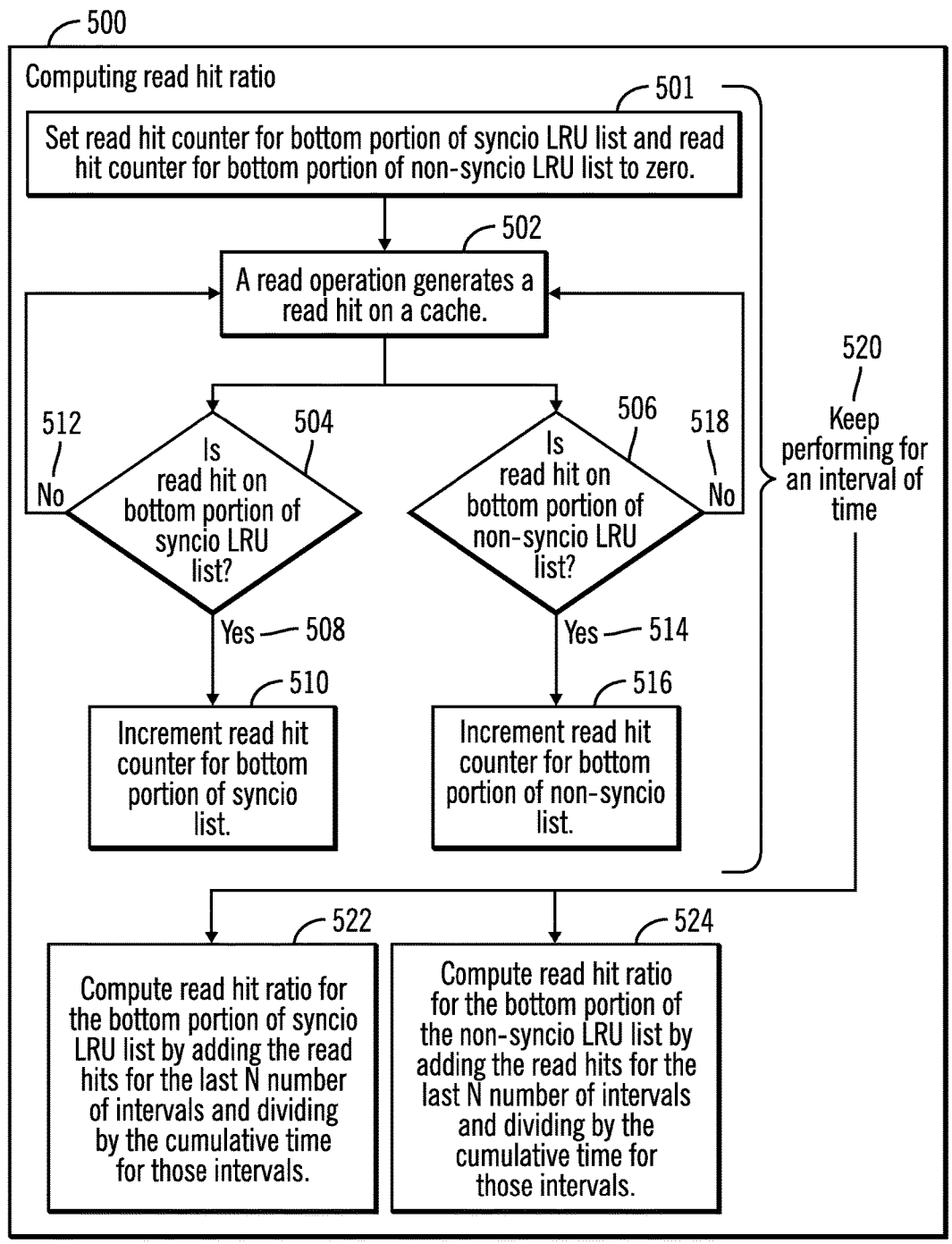
FIG. 5 illustrates a flowchart that shows how a read hit ratio is computed, in accordance with certain embodiments.

FIG. 5 illustrates a flowchart 500 that shows how a read hit ratio is computed in accordance with certain embodiments. The operations shown in FIG. 5 may be performed by the cache management application 132 that executes in the storage controller 102.

Control starts at block 501 in which the cache management application 132 sets a read hit counter for the bottom portion of the syncio LRU list 212 and a read hit counter for the bottom portion of the non-syncio LRU list 206 to zero. Control proceeds to block 502 in which a read operation generates a read hit on the cache 112, and control proceeds in parallel to block 504 and 506. At block 504, the cache management application 132 determines whether the read hit is on the bottom portion of the syncio LRU list 212 and if so ("Yes" branch 508) a read hit counter for the bottom portion of the syncio list 212 is incremented (at block 510). Otherwise ("No" branch 512), control returns to block 502.

At block 506, the cache management application 132 determines whether the read hit is on the bottom portion of the non-syncio LRU list 206 and if so ("Yes" branch 514) a read hit counter for the bottom portion of the non-syncio list 206 is incremented (at block 516). Otherwise ("No" branch 518), control returns to block 502. The operations of block 501, 502, 504, 506, 508, 510, 512, 514, 516. 518 are performed for an interval of time (e.g., 800 milliseconds) repeatedly (as shown via reference numeral 520).

While the operations shown via reference numeral 520 are being performed, the operations shown in blocks 522 and 524 are performed. At block 522 the cache management application 132 computes the read hit ratio for the bottom portion of syncio list 212 by adding the read hits for the last N number of intervals and dividing by the cumulative time for those intervals. At block 524 the cache management application 132 computes the read hit ratio for the bottom portion of the non-syncio list 206 by adding the read hits for the last N number of intervals and dividing by the cumulative time for those intervals. In certain embodiments N may be a number such as 30.

Therefore, FIG. 5 illustrates certain embodiments for computing the read hit ratio on bottom portions of the non-syncio LRU list 134 and syncio LRU list 136 for using in the operations shown in FIG. 4.

Figure 6:
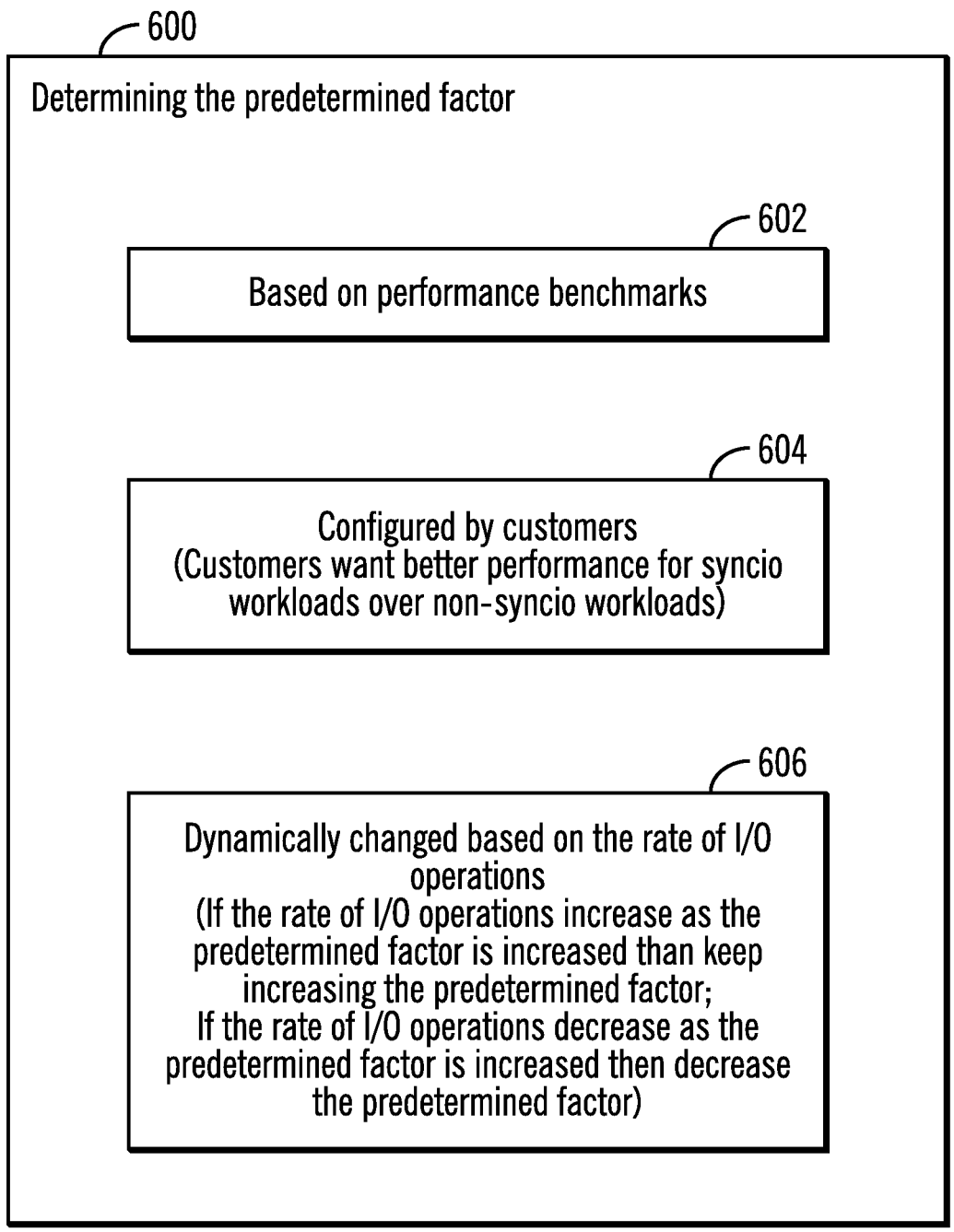
FIG. 6 illustrates a block diagram that shows how a predetermined factor for demotion of tracks is computed, in accordance with certain embodiments.

FIG. 6 illustrates a block diagram 600 that shows how a predetermined factor for demotion of tracks is computed, in accordance with certain embodiments. Exemplary predetermined factors have been shown to be used in block 312 of FIG. 3, and block 428 of FIG. 4.

In certain embodiments, the predetermined factor may be based on performance benchmarks of the system (as shown via reference numeral 602). In other embodiments, the predetermined factor may be configured by customers who desire better performance for syncio workloads over non-syncio workloads (as shown via reference numeral 604). In yet further embodiments, the predetermined factor may be dynamically changed based on the rate of I/O operations occurring the storage controller 102 (as shown via reference numeral 606). For example, if the rate of I/O operations increase as the predetermined factor is increased than the cache management application 132 keeps increasing the predetermined factor, and if the rate of I/O operations decrease as the predetermined factor is increased then the cache management application 132 keeps decreasing the predetermined factor.

Figure 7:
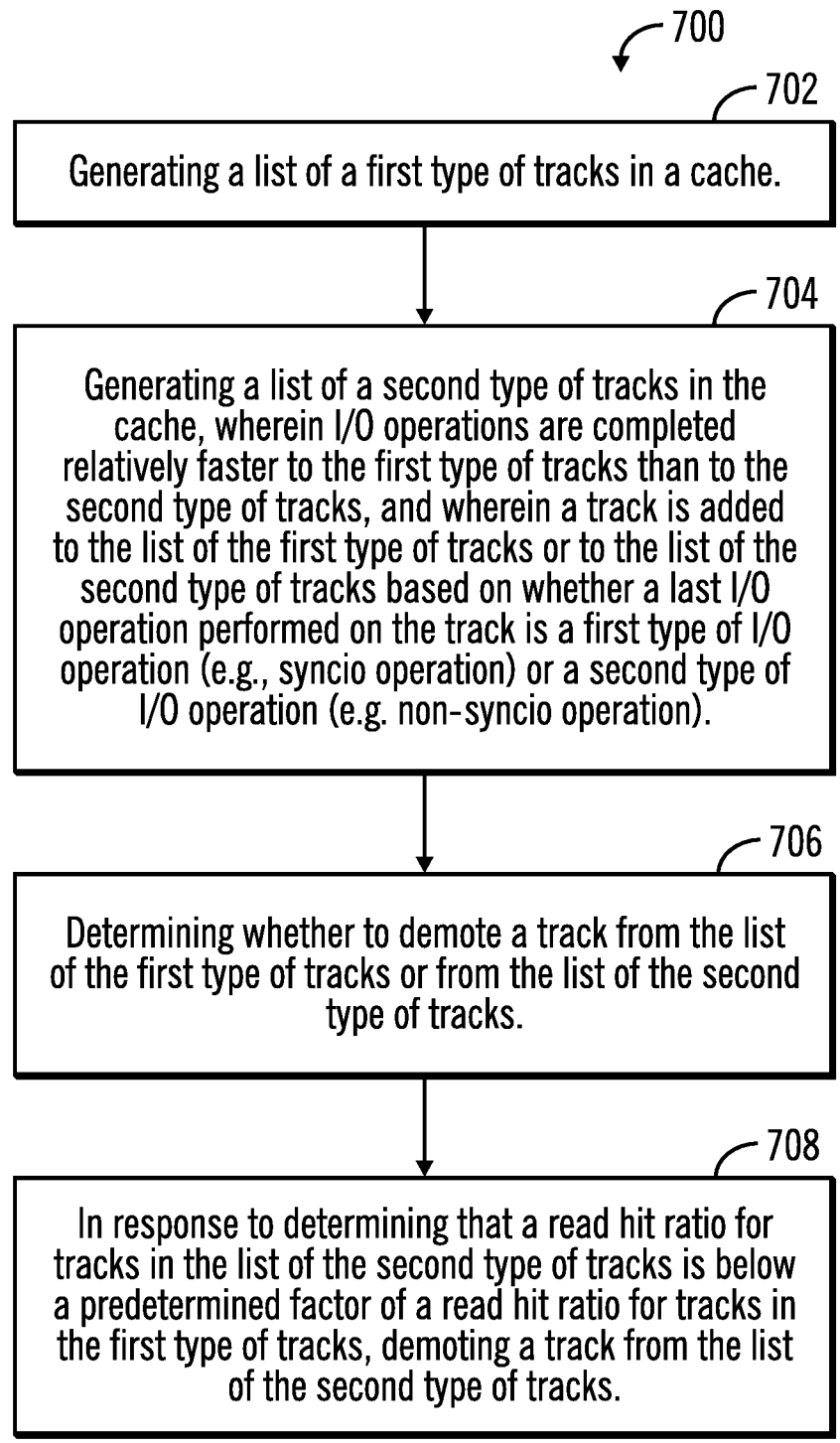
FIG. 7 illustrates a flowchart that shows demotion of tracks based on generating lists of two different types of tracks, in accordance with certain embodiments.

FIG. 7 illustrates a flowchart 700 that shows demotion of tracks based on generating lists of two different types of tracks, in accordance with certain embodiments. The operations shown in FIG. 7 may be performed by the cache management application 132 that executes in the storage controller 102.

Control starts at block 702 in which a list of a first type of tracks (e.g. syncio LRU list 136) in a cache 112 is generated. Control proceeds to block 704 in which a list of a second type of tracks (non-syncio LRU list 134) in the cache 112 is generated, wherein I/O operations are completed relatively faster to the first type of tracks than to the second type of tracks, and wherein a track is added to the list of the first type of tracks or to the list of the second type of tracks based on whether a last I/O operation performed on the track is a first type of I/O operation (e.g., syncio operation) or a second type of I/O operation (e.g. non-syncio operation). For example, if the last I/O operation performed on a track is a syncio operation then the track is added to the syncio LRU list 136, and if the last I/O operation performed on a track is a non-syncio operation then the track is added to the non-syncio LRU list 134. A determination is made (at block 706) as to whether to demote a track from the list of the first type of tracks or from the list of the second type of tracks. The first type of tracks may be syncio tracks, where for performing an I/O operation to a syncio track, an application thread is held in a spin loop waiting for the I/O operation to complete. The second type of tracks may be non-syncio tracks, where for performing the I/O operation to a non-syncio track, holding of the application thread in the spin loop is avoided.

In certain embodiments, tracks in the list of the first type of tracks are ordered based on how recently each track in the list of the first type of tracks has been used (e.g., as shown via reference numerals 208, 210), wherein tracks in the list of the second type of tracks are ordered based on how recently each track in the list of the second type of tracks has been used (e.g., as shown via reference numerals 202, 204), where a track is said to be used if a read hit has occurred on the track.

To perform the determination on track demotion shown in block 706, in certain embodiments, in response to determining that a read hit ratio for tracks in the list of the second type of tracks is less than a predetermined factor of a read hit ratio for tracks in the first type of tracks, a track is demoted (at block 708) from the list of the second type of tracks. The read hit ratio for tracks in the list of the first type of tracks and the read hit ratio for tracks in the list of the second type of tracks are computed based on read hits on a predetermined bottom portion of the list of the first type of tracks and the second type of tracks. The predetermined factor is adjusted to increase a rate of input/output (I/O) operations.

Therefore, FIGS. 1-7 illustrate certain embodiments in which by maintaining separate LRU lists for syncio tracks and non-syncio tracks and using demotion mechanisms based on the separate LRU lists, syncio operations are completed faster in comparison to embodiments in which only a single LRU list is maintained. In certain embodiments, whenever it is possible, tracks from the LRU list of non-syncio tracks (non-syncio LRU list 134) are demoted rather than tracks from the LRU list of syncio tracks (syncio LRU list 136), unless the rate of I/O operations in the system decrease as a result of such demotions.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 8:
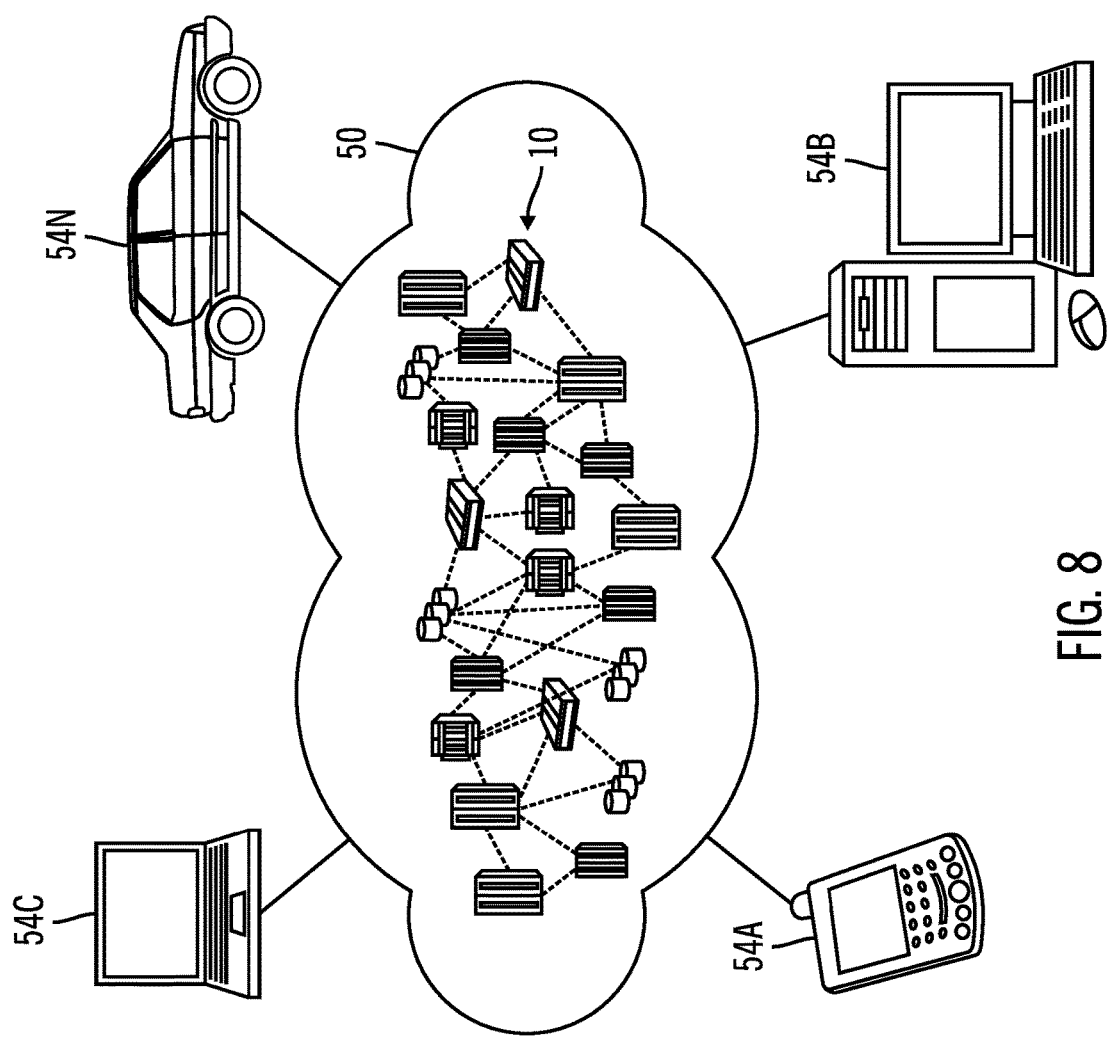
FIG. 8 illustrates a block diagram of a cloud computing environment, in accordance with certain embodiments.

Referring now to FIG. 8 an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
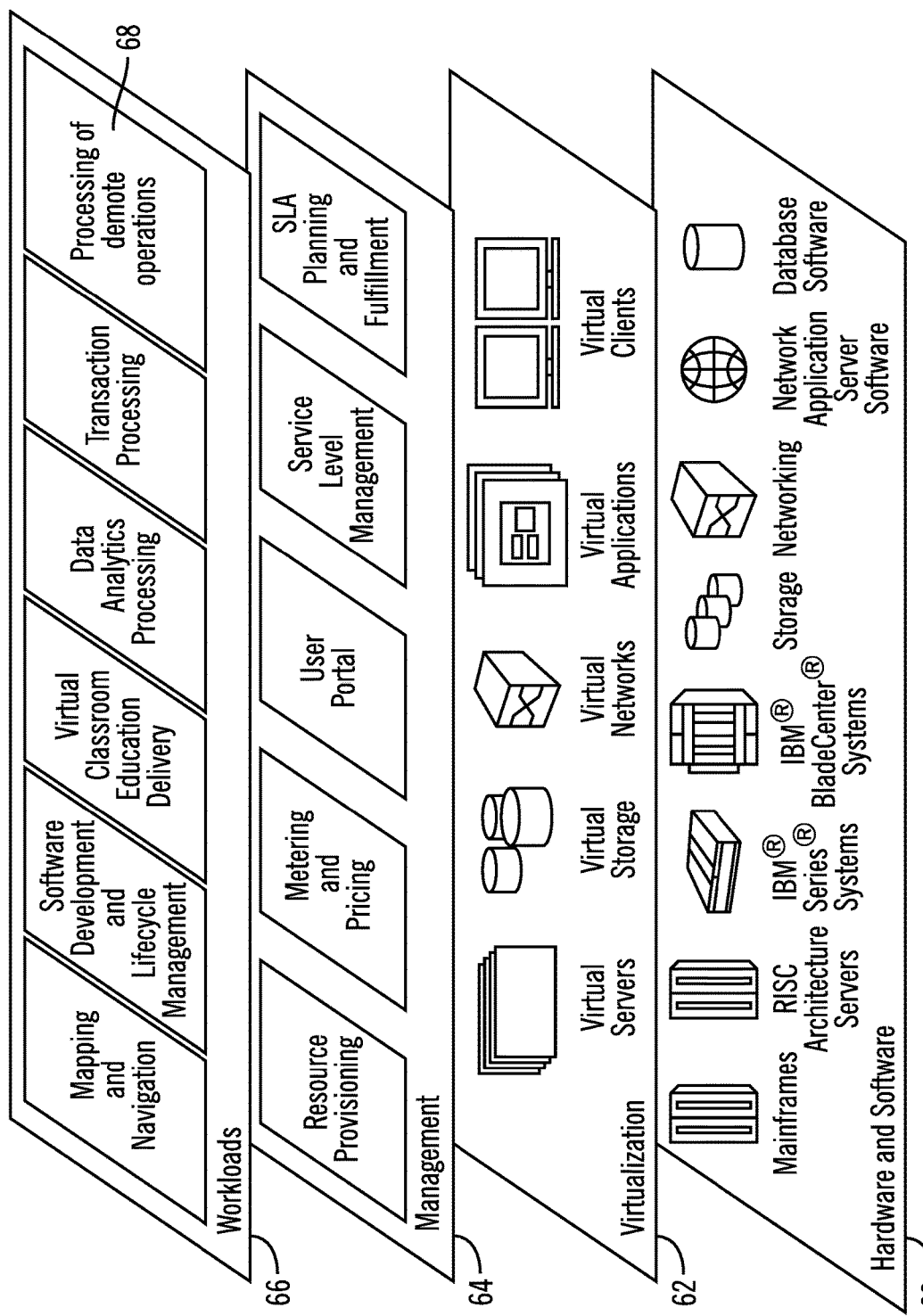
FIG. 9 illustrates a block diagram of further details of the cloud computing environment of FIG. 8, in accordance with certain embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and processing of demote operations 68 as shown in FIGS. 1-8.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
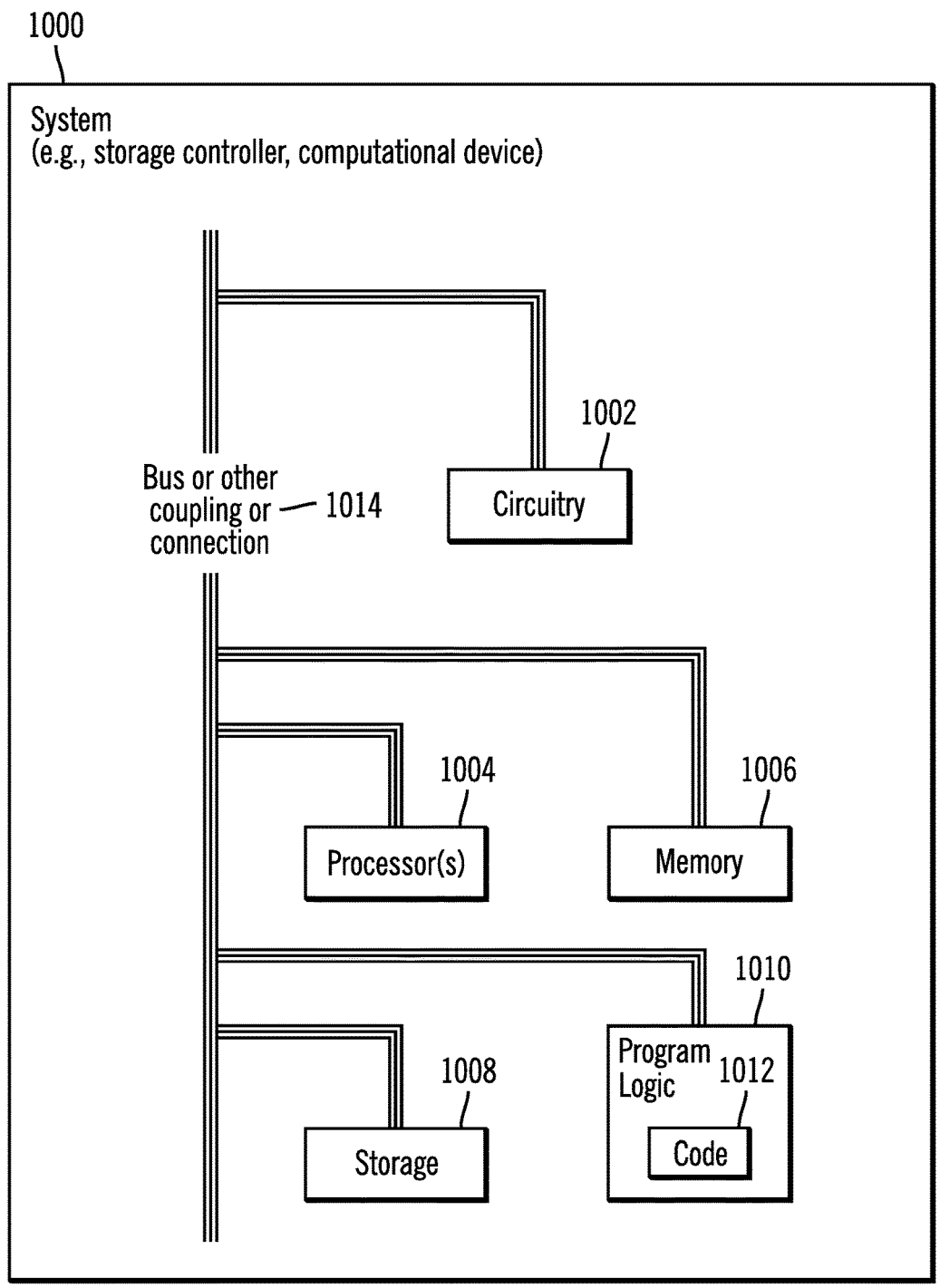
FIG. 10 illustrates a block diagram of a computational system that shows certain elements that may be included in the storage controller or the host, as described in FIGS. 1-9, in accordance with certain embodiments.

FIG. 10 illustrates a block diagram that shows certain elements that may be included in the storage controller 102 or the hosts 104, 106, or other computational devices in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. One or more of the components in the system 1000 may communicate via a bus or via other coupling or connection 1014. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

* IBM, zSeries, pSeries, xSeries, BladeCenter, WebSphere, and DB2 are trademarks of International Business Machines Corporation registered in many jurisdictions worldwide.

What is claimed is:

1. A method, comprising:
generating a list of a first type of tracks in a cache;
generating a list of a second type of tracks in the cache, wherein a track is added to the list of the first type of tracks or to the list of the second type of tracks based on whether a last I/O operation performed on the track is a first type of I/O operation or a second type of I/O operation; and
determining whether to demote a track from the list of the first type of tracks or from the list of the second type of tracks, wherein:
for performing the first type of I/O operation to a first type of track, an application thread is held in a spin loop waiting for the first type of I/O operation to complete; and
for performing the second type of I/O operation to a second type of track, holding of the application thread in the spin loop is avoided.

2. The method of claim 1, wherein the first type of tracks are syncio tracks.

3. The method of claim 2, wherein the second type of tracks are non-syncio tracks.

4. The method of claim 3, wherein tracks in the list of the first type of tracks are ordered based on how recently each track in the list of the first type of tracks has been used, and wherein tracks in the list of the second type of tracks are ordered based on how recently each track in the list of the second type of tracks has been used.

5. The method of claim 4, the method further comprising:
in response to determining that a read hit ratio for tracks in the list of the second type of tracks is less than a predetermined factor of a read hit ratio for tracks in the first type of tracks, demoting a track from the list of the second type of tracks.

6. The method of claim 5, wherein the read hit ratio for tracks in the list of the first type of tracks and the read hit ratio for tracks in the list of the second type of tracks are computed based on read hits on a predetermined bottom portion of the list of the first type of tracks and the second type of tracks.

7. The method of claim 5, the method further comprising:
adjusting the predetermined factor to increase a rate of input/output (I/O) operations.

8. A system, comprising:
a memory; and
a processor coupled to the memory, wherein the processor performs operations, the operations performed by the processor comprising:
generating a list of a first type of tracks in a cache;
generating a list of a second type of tracks in the cache, wherein a track is added to the list of the first type of tracks or to the list of the second type of tracks based on whether a last I/O operation performed on the track is a first type of I/O operation or a second type of I/O operation; and
determining whether to demote a track from the list of the first type of tracks or from the list of the second type of tracks, wherein:
for performing the first type of I/O operation to a first type of track, an application thread is held in a spin loop waiting for the first type of I/O operation to complete; and
for performing the second type of I/O operation to a second type of track, holding of the application thread in the spin loop is avoided.

9. The system of claim 8, wherein the first type of tracks are syncio tracks.

10. The system of claim 9, wherein the second type of tracks are non-syncio tracks, wherein for performing the I/O operation to a non-syncio track.

11. The system of claim 10, wherein tracks in the list of the first type of tracks are ordered based on how recently each track in the list of the first type of tracks has been used, and wherein tracks in the list of the second type of tracks are ordered based on how recently each track in the list of the second type of tracks has been used.

12. The system of claim 11, the operations further comprising:
in response to determining that a read hit ratio for tracks in the list of the second type of tracks is less than a predetermined factor of a read hit ratio for tracks in the first type of tracks, demoting a track from the list of the second type of tracks.

13. The system of claim 12, wherein the read hit ratio for tracks in the list of the first type of tracks and the read hit ratio for tracks in the list of the second type of tracks are computed based on read hits on a predetermined bottom portion of the list of the first type of tracks and the second type of tracks.

14. The system of claim 12, the operations further comprising:
adjusting the predetermined factor to increase a rate of input/output (I/O) operations.

15. A computer program product, the computer program product comprising a computer readable storage medium having computer readable program code embodied therewith, the computer readable program code configured to perform operations, the operations comprising:

generating a list of a first type of tracks in a cache;

generating a list of a second type of tracks in the cache, wherein a track is added to the list of the first type of tracks or to the list of the second type of tracks based on whether a last I/O operation performed on the track is a first type of I/O operation or a second type of I/O operation; and determining whether to demote a track from the list of the first type of tracks or from the list of the second type of tracks, wherein:

for performing the first type of I/O operation to a first type of track, an application thread is held in a spin loop waiting for the first type of I/O operation to complete; and for performing the second type of I/O operation to a second type of track, holding of the application thread in the spin loop is avoided.

16. The computer program product of claim 15, wherein the first type of tracks are syncio tracks.

17. The computer program product of claim 16, wherein the second type of tracks are non-syncio tracks.

18. The computer program product of claim 17, wherein tracks in the list of the first type of tracks are ordered based on how recently each track in the list of the first type of tracks has been used, and wherein tracks in the list of the second type of tracks are ordered based on how recently each track in the list of the second type of tracks has been used.

19. The computer program product of claim 18, the operations further comprising:

in response to determining that a read hit ratio for tracks in the list of the second type of tracks is less than a predetermined factor of a read hit ratio for tracks in the first type of tracks, demoting a track from the list of the second type of tracks.

20. The computer program product of claim 19, wherein the read hit ratio for tracks in the list of the first type of tracks and the read hit ratio for tracks in the list of the second type of tracks are computed based on read hits on a predetermined bottom portion of the list of the first type of tracks and the second type of tracks.

21. The computer program product of claim 19, the operations further comprising:

adjusting the predetermined factor to increase a rate of input/output (I/O) operations.

22. A storage controller, comprising:

a cache; and a cache management application maintained in the storage controller, wherein the cache management application performs operations, the operations comprising:

generating a list of a first type of tracks in the cache;

generating a list of a second type of tracks in the cache, wherein a track is added to the list of the first type of tracks or to the list of the second type of tracks based on whether a last I/O operation performed on the track is a first type of I/O operation or a second type of I/O operation; and determining whether to demote a track from the list of the first type of tracks or from the list of the second type of tracks, wherein:

for performing the first type of I/O operation to a first type of track, an application thread is held in a spin loop waiting for the first type of I/O operation to complete; and for performing the second type of I/O operation to a second type of track, holding of the application thread in the spin loop is avoided.

23. The storage controller of claim 22, wherein the first type of tracks are syncio tracks.

24. The storage controller of claim 23, wherein the second type of tracks are non-syncio tracks.

25. The storage controller of claim 24, wherein tracks in the list of the first type of tracks are ordered based on how recently each track in the list of the first type of tracks has been used, and wherein tracks in the list of the second type of tracks are ordered based on how recently each track in the list of the second type of tracks has been used.

\* \* \* \* \*